United States Patent
Anzel

[11] Patent Number: 6,042,058
[45] Date of Patent: Mar. 28, 2000

[54] STATIONKEEPING AND MOMENTUM-DUMPING THRUSTER SYSTEMS AND METHODS

[75] Inventor: Bernard M. Anzel, El Segundo, Calif.

[73] Assignee: Hughes Electronics Corporation, Los Angeles, Calif.

[21] Appl. No.: 08/841,211

[22] Filed: Apr. 29, 1997

[51] Int. Cl.[7] .................................................. B64G 1/24
[52] U.S. Cl. ........................ 244/164; 244/165; 244/169; 701/13
[58] Field of Search .................. 244/164, 165, 244/166, 169, 158 R; 701/13

[56] References Cited

U.S. PATENT DOCUMENTS

| | | | |
|---|---|---|---|
| 4,767,084 | 8/1988 | Chan, et al. | 244/164 |
| 5,020,746 | 6/1991 | Anzel | 244/169 |
| 5,443,231 | 8/1995 | Anzel | 244/169 |
| 5,765,780 | 6/1998 | Barskey et al. | 244/164 |
| 5,810,295 | 9/1998 | Anzel | 244/164 |
| 5,826,831 | 10/1998 | Anzel | 244/164 |
| 5,855,341 | 1/1999 | Aoki et al. | 244/176 |

OTHER PUBLICATIONS

Anzel, Bernard M., "Controlling a Stationary Orbit Using Electric Propulsion",DGLR/AIAA/JSASS 20th International Electric Propulsion Conference, Oct. 3–6, 1988, Garmish/Partenkirchen, West Germany.

Balsam, Richard E. et al., "Simplified Approach for Correction of Perturbations on a Stationary Orbit", *Journal of Spacecraft and Rockets*, vol. 6 No. 7, Jul. 1969, pp. 805–811.

*Primary Examiner*—Galen L. Barefoot
*Attorney, Agent, or Firm*—Terje Gudmestad; Georgann Grunebach; Michael W. Sales

[57] ABSTRACT

Spacecraft stationkeeping and momentum-dumping methods are facilitated by the use of selected diagonal pairs of thrusters which are positioned adjacent to nadir or antinadir spacecraft faces. The methods maintain an elliptical Sun-synchronous orbit, counter triaxiality forces and facilitate momentum-dumping of momentum and/or reaction wheels. They are particularly suited for inclined orbits.

22 Claims, 6 Drawing Sheets

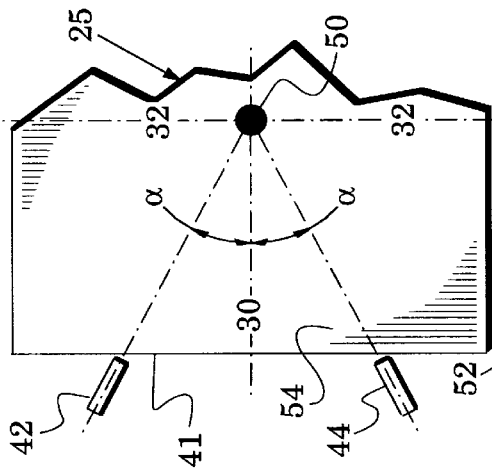
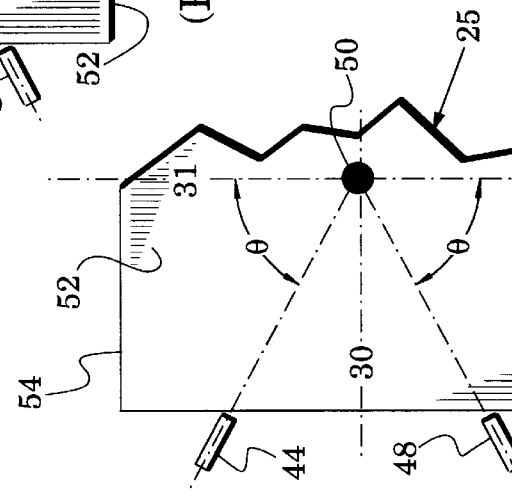
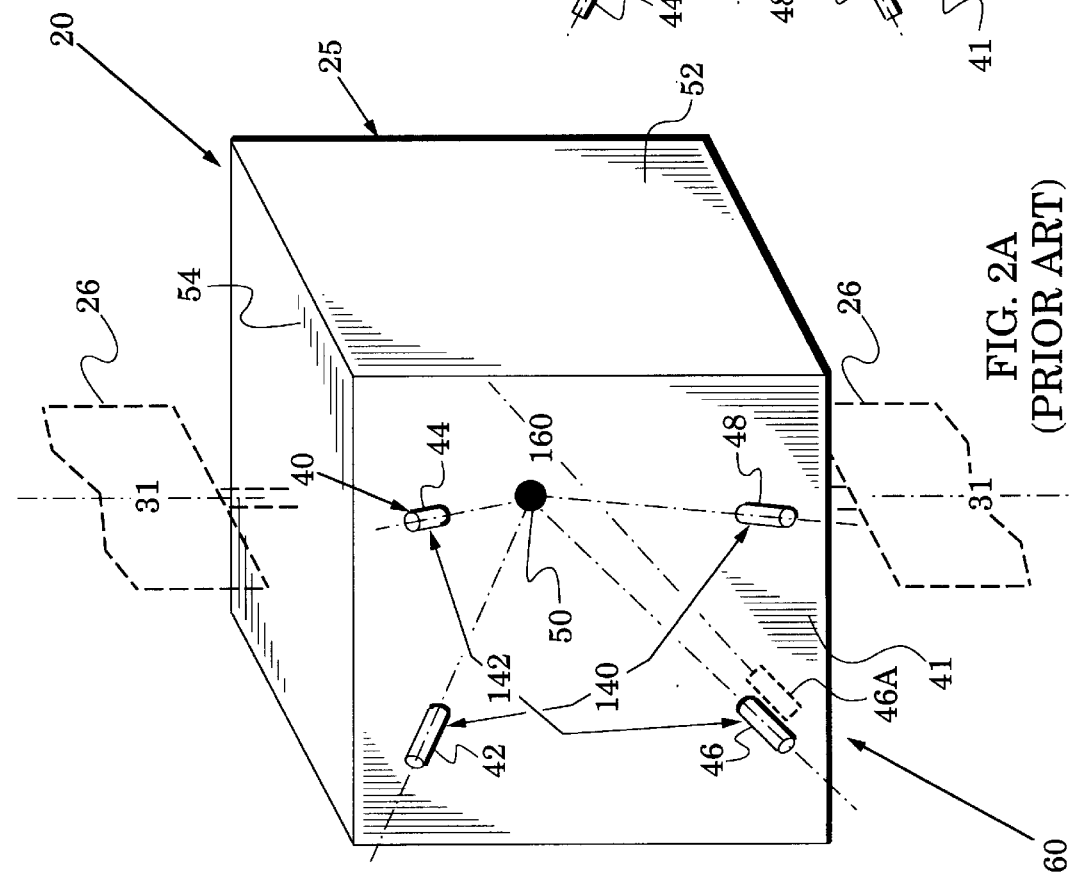
FIG. 2C (PRIOR ART)
FIG. 2B (PRIOR ART)
FIG. 2A (PRIOR ART)

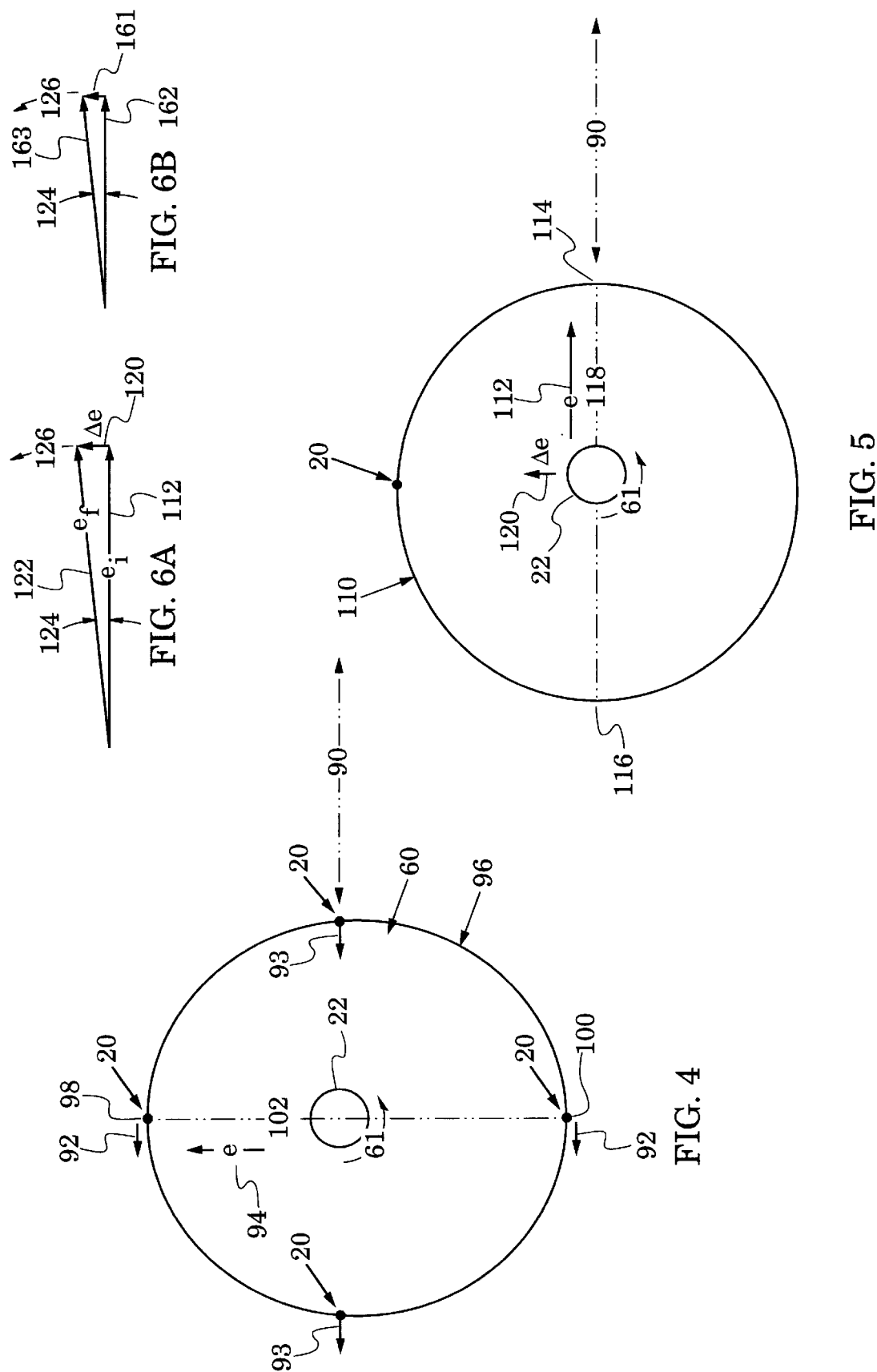

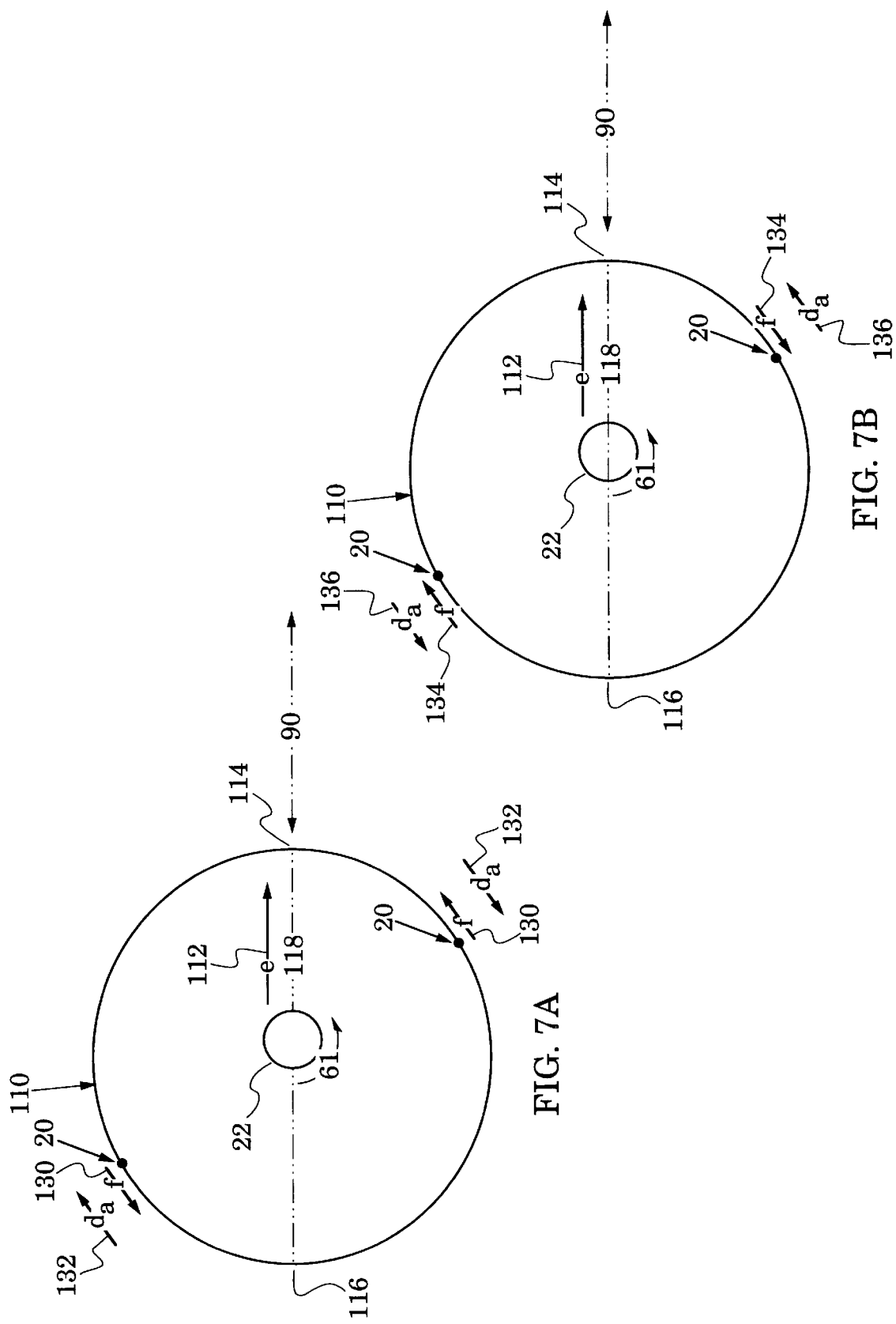

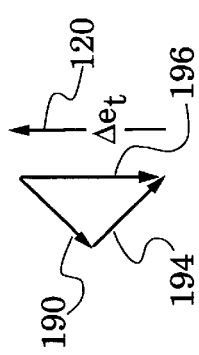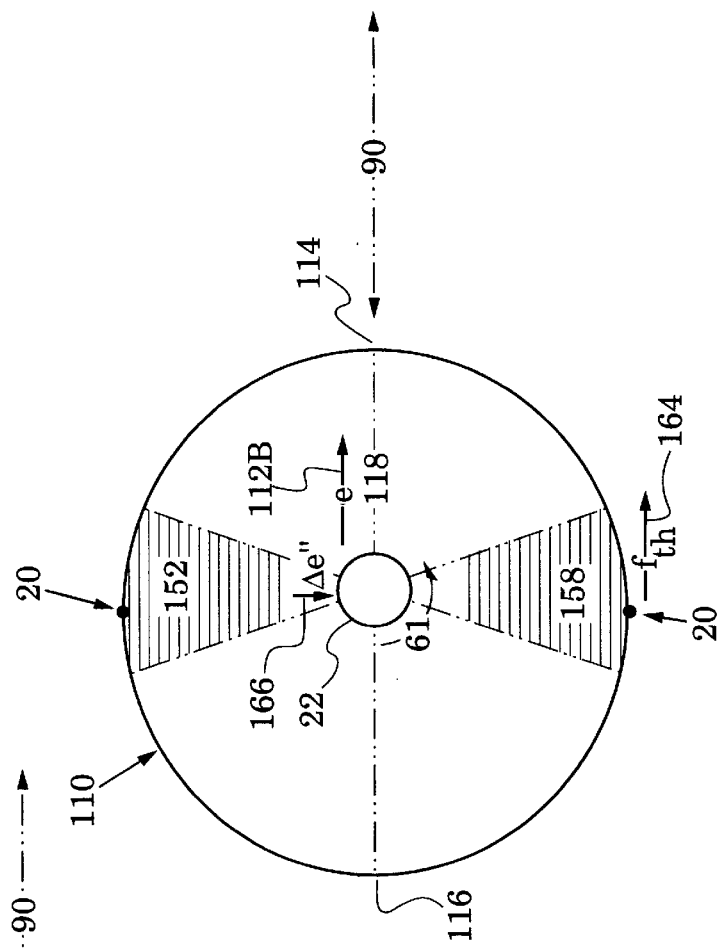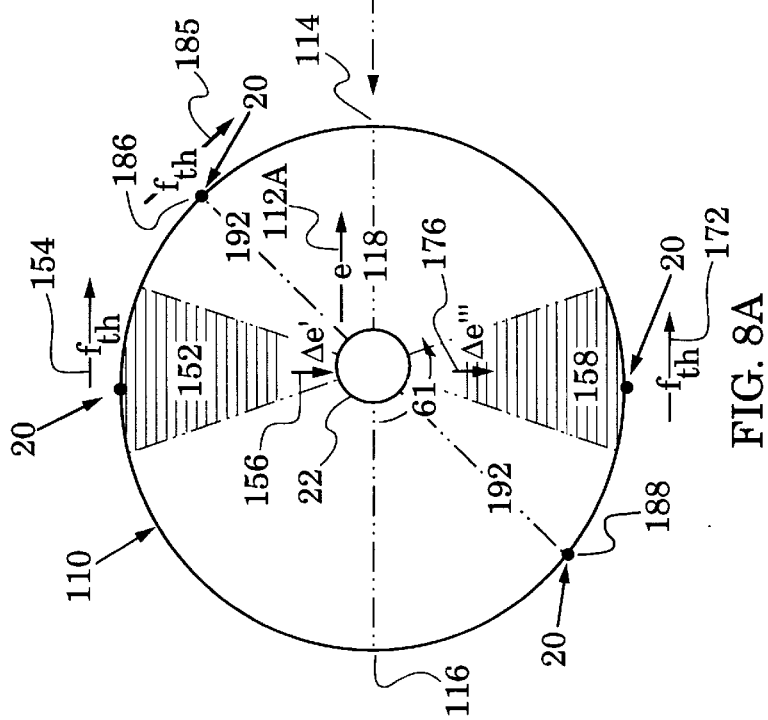

STATIONKEEPING AND MOMENTUM-DUMPING THRUSTER SYSTEMS AND METHODS

BACKGROUND OF THE INVENTION

1. Field of the Invention

The present invention relates generally to spacecraft and more particularly to spacecraft stationkeeping.

2. Description of the Related Art

FIG. 1 shows a spacecraft 20 orbiting the Earth 22 in an orbital plane 24. A typical spacecraft includes a body 25, solar cell arrays 26 which are directed towards the Sun for generation of electrical power and at least one antenna 28 which is directed towards the Earth 22 for communication and tracking.

Spacecraft are placed in Earth orbits for a variety of purposes, e.g., weather monitoring, scientific observations and commercial communications. Accordingly, they are maintained in a variety of attitudes and placed in a variety of orbits (e.g., low Earth orbit, transfer orbit, inclined synchronous orbit and geostationary orbit). A spacecraft's attitude is typically defined with respect to a coordinate system that has an origin at the satellite's center of mass. The coordinate system of FIG. 1 has a yaw axis 30 which is directed from the origin towards the Earth's center of mass. A pitch axis 31 is directed from the origin and is normal to the satellite's orbital plane 24. A roll axis 32 is normal to the other two axes and is aligned with the satellite's velocity vector.

A spacecraft's orbital position is typically defined by the orbit's eccentricity, the inclination of the orbital plane from the Earth's equatorial plane and the spacecraft's longitude. In a geostationary orbit, the spacecraft's orbital period matches the Earth's rotational period, the eccentricity is substantially zero and the spacecraft's orbital plane is substantially coplanar with the Earth's equatorial plane. The principal forces which disturb a spacecraft's position are generated by the gravity of the sun and the moon, the Earth's elliptical shape (triaxiality) and solar radiation pressure.

The processes of maintaining a spacecraft's position with respect to the Earth and its attitude with respect to a coordinate system are respectively referred to as stationkeeping and attitude control. Stationkeeping may be facilitated with thrusters which are directed to generate forces through the spacecraft's center of mass. Attitude control is generally facilitated with momentum and/or reaction wheels whose momentum is periodically "dumped" when the same (or different) thrusters are directed to generate turning moments about the spacecraft's center of mass.

Conventional thruster systems typically have sets of thrusters that are aligned in north-south and east-west directions. The north-south thrusters produce north-south velocity changes (ΔV) to control inclination. The east-west thrusters produce an east-west ΔV to control drift (change of longitude with time) and eccentricity.

A different thruster system was described in U.S. Pat. No. 5,443,231 which issued Aug. 22, 1995 to Bernard Anzel and was assigned to Hughes Electronics, the assignee of the present invention. As shown in FIGS. 2A–2C, this thruster system 40 is carried adjacent to an antinadir face 41 of the spacecraft and has thrusters 42, 44, 46 and 48 which are respectively positioned in northwest, northeast, southwest and southeast regions of the antinadir face 41 and directed through the spacecraft's center of mass 50.

When viewed from an east body face 52, the north thrusters 42 and 44 and the south thrusters 46 and 48 are seen to be canted oppositely from the pitch axis 31 by an angle θ. When viewed from a north body face 54, the west thrusters 42 and 46 and east thrusters 44 and 48 are oppositely slewed from the yaw axis 30 by an angle α. These angles can be changed as required, e.g., with gimbals and servo mechanisms.

In an exemplary stationkeeping process, the north thrusters 42 and 44 and the south thrusters 46 and 48 are respectively fired in the regions of 90 degrees R.A. (right ascension) and 270 degrees R.A. so that their normal thrust components (normal to the orbital plane) control inclination errors. The radial thrust components of the north and south thrusters are opposed in direction and, if not equal, may generate a net eccentricity component. However, since these radial thrust components are directed inward, they produce an unwanted eastward longitudinal shift which can be compensated with tangential thrust components.

The north and south thrusters can generate a net tangential thrust component that adjusts eccentricity along an axis through 90 degrees R.A. and 270 degrees R.A.. This tangential thrust component also changes the orbital diameter to counter the drift effects of the triaxiality force (a tangential force caused by the Earth's triaxiality and whose magnitude and direction are a function of the spacecraft's longitudinal position) and the unwanted eastward longitudinal drift mentioned above. The north and south thrusters can also generate a net radial thrust component that controls orbital eccentricity along an axis through 0 degrees R.A. and 180 degrees R.A.

Geostationary spacecraft must typically be stationkept within assigned orbital "boxes" which have predetermined side dimensions (e.g., ~147 kilometers). Because the number of geostationary boxes is limited and communication demands constantly increase, there is increasing commercial pressure to locate more than one satellite in an orbital box, i.e., an increasing pressure to co-locate n satellites in a single orbital box. Accordingly, in copending application Ser. No. 08/701,513, filed Aug. 22, 1996 in the name of Bernard Anzel and assigned to Hughes Electronics, the assignee of the present invention, the thruster system 40 of FIGS. 2A–2C is used in a novel co-location method.

Stationkeeping of spacecraft in geostationary orbits necessarily includes reduction of orbital inclination. Of the orbital parameters (i.e., inclination, eccentricity and drift), control of inclination requires the most thruster fuel. However, inclination control is generally not needed for spacecraft in inclined orbits. Stationkeeping and momentum dumping for such spacecraft will thus typically require control processes that differ from those which are suited for spacecraft in geostationary orbits.

SUMMARY OF THE INVENTION

The present invention is directed to spacecraft stationkeeping and momentum-dumping methods which are especially suited for spacecraft in inclined orbits.

These methods are realized with selected ones of first and second pairs of diagonal thrusters that are positioned adjacent to a nadir or an antinadir spacecraft face. A stationkeeping method initially places the spacecraft in a Sun-synchronous elliptical orbit which has an initial eccentricity vector aligned with a Sun line between the spacecraft and a Sun. Solar pressure thereby generates a solar-pressure eccentricity vector which leads the Sun line by substantially ninety degrees;

If the spacecraft is positioned at a longitude where it is exposed to an eastward triaxiality force, a tangential westward force is applied with a selected thruster pair in an orbital region which leads the Sun line by substantially ninety degrees. The magnitude of the tangential force is selected to counter the drift acceleration of the triaxiality force. This tangential force is associated with a westward-force eccentricity vector which opposes the solar-pressure eccentricity vector.

Alternatively, if the spacecraft is positioned at a longitude where it is exposed to a westward triaxiality force, a tangential eastward force is applied with a selected thruster pair in an orbital region which lags the Sun line by substantially ninety degrees. This counters a drift acceleration caused by the westward triaxiality force and is associated with an eastward-force eccentricity vector that opposes the solar-pressure eccentricity vector.

The net change in eccentricity over time is the difference between the solar-pressure eccentricity vector and that of either the westward-force eccentricity vector or the eastward-force eccentricity vector. The initial eccentricity vector is selected so that this net change rotates the initial eccentricity vector by approximately one degree each day to thereby maintain the Sun-synchronous orbit.

In a method embodiment, momentum dumping is accomplished with the selected thruster pair in an orbital region that is ~180 degrees from the application of the westward or eastward force. The thrust and direction are selected so that the momentum-dumping forces generate a substantially zero tangential component and generate a radial component which substantially equals that generated at the application of the westward or eastward force.

In another method embodiment, a tangential westward force is applied with a selected thruster pair in an orbital region which leads the Sun line by substantially ninety degrees and a tangential eastward force is applied with the selected thruster pair in an orbital region which lags the Sun line by substantially ninety degrees. The magnitudes of the westward force and the eastward force are selected to provide a differential westward force or a differential eastward force that counters the drift acceleration of the triaxiality forces. This method generates a greater eccentricity vector to oppose and further reduce the solar-pressure eccentricity vector. This facilitates a reduction of the eccentricity of the Sun-synchronous orbit and a reduction of the cyclical drift that always accompanies an eccentric orbit.

In another method embodiment, a thruster pair generates a tangential westward force component in a region that leads the Sun line between 0 and 180 degrees if the satellite is subjected to an eastward triaxiality force and generates a tangential eastward force in a region that lags the Sun line between 0 and 180 degrees if the satellite is subjected to a westward triaxiality force. The magnitude of the tangential component is selected to counter the drift acceleration of the triaxiality force. A momentum-dumping force is generated by a thruster pair at a second firing point that is substantially one hundred eighty degrees from the first firing point. The firings at the first and second firing points are configured to also produce a net radial force. An eccentricity vector associated with the net radial component is normal to an eccentricity vector associated with the tangential component. These vectors add vectorially to produce a total eccentricity vector which is larger than the eccentricity vector obtainable with the tangential component only. Finally, the location of the first and second firing points is selected to place the total eccentricity vector in opposition to the Sun-generated eccentricity vector.

Although the methods of the invention typically generate small normal thrust components, such components are generally acceptable for spacecraft in inclined orbits. The teachings of the invention may be practiced with either of the first and second pairs as the selected thruster pair and the selected pair can be changed as often as desired. Because the methods of the invention can be carried out with only one selected thruster pair, the methods have a built-in redundancy which counters thruster failure.

The novel features of the invention are set forth with particularity in the appended claims. The invention will be best understood from the following description when read in conjunction with the accompanying drawings.

BRIEF DESCRIPTION OF THE DRAWINGS

FIG. 2A is an enlarged view of the spacecraft of FIG. 1 which illustrates a conventional thruster system adjacent to an antinadir face of the spacecraft;

FIG. 2B is a view of an east face of the spacecraft of FIG. 2A;

FIG. 2C is a view of a north face of the spacecraft of FIG. 2A;

FIG. 4 is a view similar to FIG. 3A which illustrates that solar pressure along a Sun line produces an elliptical orbit whose major axis is normal to the Sun line and whose eccentricity vector leads the Sun line;

FIG. 5 is a view similar to FIG. 4 which illustrates a Sun-synchronous orbit whose eccentricity vector is aligned with the Sun line and directed at the Sun;

FIG. 6A is a vector diagram which shows that a proper selection of the eccentricity vector of FIG. 5 can maintain the alignment between the eccentricity vector and the Sun line in FIG. 5;

FIG. 6B is a vector diagram which illustrates an eccentricity reduction that results from tangential thruster forces;

FIG. 7A is a view similar to FIG. 5 which illustrates an eastward force and a westward drift acceleration generated by the Earth's triaxiality when the initial longitude of the spacecraft of FIG. 1 is selected from a first set of longitudes;

FIG. 7B is a view similar to FIG. 7A which illustrates a westward force and an eastward drift acceleration generated by the Earth's triaxiality when the initial longitude of the spacecraft of FIG. 1 is selected from a second set of longitudes;

FIG. 8A is a view similar to FIG. 7A which illustrates a tangential westward thrust that substantially eliminates the westward drift acceleration of FIG. 7A;

FIG. 8B is a view similar to FIG. 7B which illustrates a tangential eastward thrust that substantially eliminates the eastward drift acceleration of FIG. 7B; and FIG. 9 is a view which illustrates summation of eccentricity vectors in a stationkeeping and momentum-dumping method of the invention.

DETAILED DESCRIPTION OF THE PREFERRED EMBODIMENTS

Figure 3B:
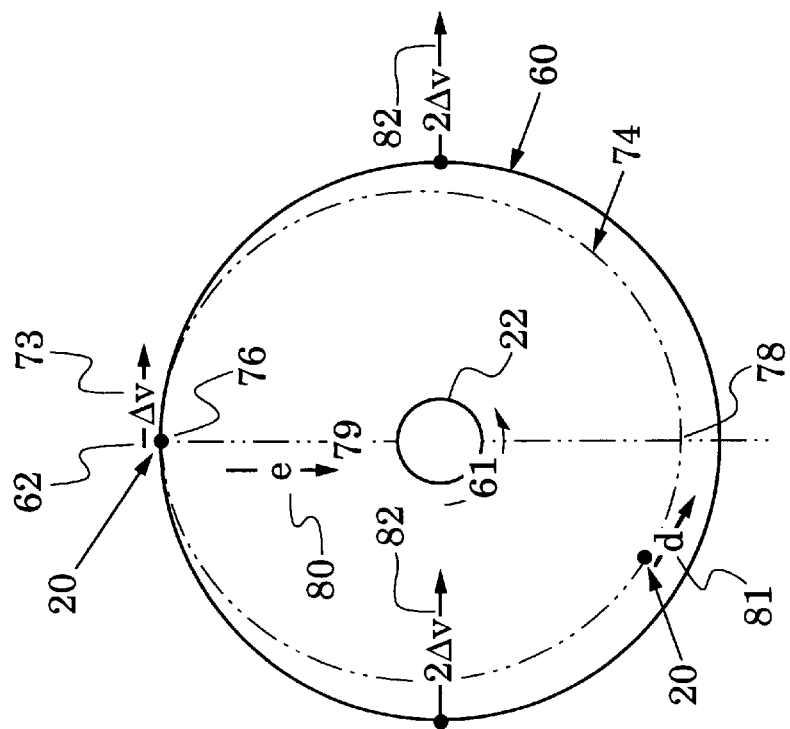
FIG. 3B is a view similar to FIG. 3A which illustrates that a westward velocity change produces a eastward drift of the spacecraft.
Figure 3A:
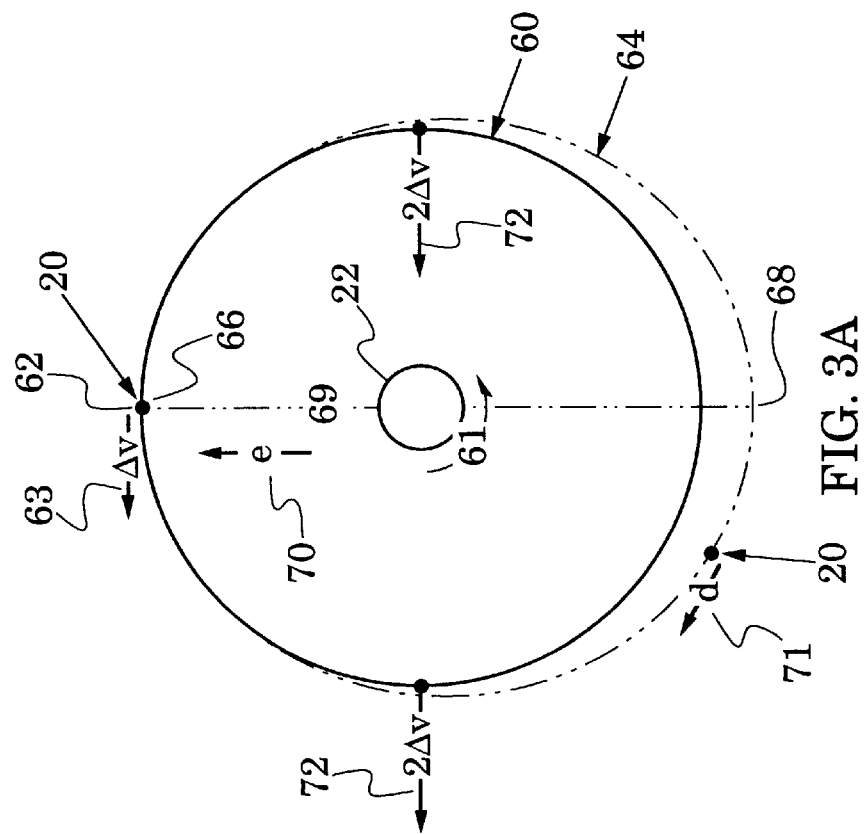
FIG. 3A is a schematic view of FIG. 1 which illustrates that an eastward velocity change produces a westward drift of the spacecraft.

Description of a stationkeeping process of the invention is facilitated by FIGS. 3A through 8B. FIG. 3A shows the spacecraft 20 in a geosynchronous circular orbit 60 about the Earth 22 which is rotating with an angular velocity 61. Accordingly, the spacecraft 20 has an Earth synchronous period and its longitude is fixed (i.e., the spacecraft exhibits no eastward or westward longitudinal drift).

If a thruster is fired at an orbital application point 62 so as to generate a tangential eastward tangential thrust, it will impart an increased change of velocity Δv to the spacecraft 20 that is indicated by a velocity vector 63 (the velocity vector is labeled Δv). Prior to the thrust, the spacecraft 20 had a velocity and altitude that was appropriate for its circular orbit 60. After the increased velocity change Δv, the velocity and altitude are appropriate for an elliptical orbit 64 having a perigee 66 at the application point 62 and an apogee 68 that is outside the circular orbit 60 and at the other end of the elliptical orbit's major axis 69.

Ellipticity is conventionally indicated by an eccentricity vector which points towards perigee and whose magnitude indicates the magnitude of eccentricity. Accordingly, after the increased change of velocity Δv, the elliptical orbit 64 is associated with an eccentricity vector 70 which is directed towards the application point 62. Because the elliptical orbit 64 is larger than the circular orbit 60, its orbital cycle time is greater and, accordingly, the spacecraft 20 exhibits a westward longitudinal drift indicated by a drift vector 71 (that is labeled d). For clarity of illustration, the drift vector is indicated at a different orbital point of the spacecraft 20.

Thus, a tangential eastward thrust at an application point increases the orbital size, causes a westward drift and is associated with an eccentricity vector that is directed towards the application point.

It is known from orbital mechanics that a similar eccentricity effect will be obtained with a radial velocity change which has twice the magnitude, i.e., 2Δv, and which is applied at another application point that is ninety degrees away from the application of the tangential thrust. This is indicated by radial vectors 72 whose application points lead and lag the application point 62 by ninety degrees.

FIG. 3B is similar to FIG. 3A with like elements indicated by like reference numbers. However, in FIG. 3B a thruster is fired at the application point 62 so as to generate a tangential westward thrust which imparts a decreased change of velocity Δv to the spacecraft 20. This is indicated by a velocity vector 73. After the decreased velocity change Δv, the velocity and altitude are appropriate for an elliptical orbit 74 having an apogee 76 at the application point 62 and a perigee 78 that is inside the circular orbit 60 and at the other end of the elliptical orbit's major axis 79.

Therefore, after the decreased change of velocity Δv, the elliptical orbit 74 is associated with an eccentricity vector 80 which is directed away from the application point 62. Because the elliptical orbit 74 is smaller than the circular orbit 60, its orbital cycle time is less and, accordingly, the spacecraft 20 exhibits an eastward longitudinal drift that is indicated by a drift vector 81 at a different orbital point of the spacecraft 20.

Thus, a westward tangential thrust at an application point decreases the orbital size, causes a eastward drift and is associated with an eccentricity vector that is directed away from the application point. A similar eccentricity effect will be obtained with a radial velocity change which has twice the magnitude, i.e., 2Δv, and which is applied at another application point that is ninety degrees away from the application of the tangential thrust. This is indicated in FIG. 3B by radial vectors 82 whose application points lead and lag the application point 62 by ninety degrees.

FIGS. 3A and 3B illustrate the effects of applied tangential and radial forces upon a spacecraft's orbit. FIG. 4 illustrates similar effects which result from solar radiation pressure on the spacecraft 20. This figure is a view similar to FIG. 3A with like elements indicated by like reference numbers.

Solar pressure is exerted along a Sun line 90 between the Sun (not shown) and the spacecraft 20. Although this solar pressure imparts a continuous change in velocity throughout the orbit, this effect is exemplified in FIG. 4 by two tangential vectors 92 and two radial vectors 93 which act upon the spacecraft 20. From FIGS. 3A and 3B it is seen that all of these change-in-velocity vectors are associated with an eccentricity vector 94 that is directed to lead the Sun line 90 by ninety degrees. Thus, solar pressure tends to change the orbit of the spacecraft 20 into the elliptical orbit 96 of FIG. 4 with a perigee 98 leading the Sun line 90 by ninety degrees and an apogee 100 which is at the other end of the elliptical orbit's major axis 102.

In contrast to FIG. 4, FIG. 5 illustrates an elliptical orbit 110 of the spacecraft 20 which has been configured to have an initial eccentricity vector 112 that is aligned with the Sun line 90. This figure is a view similar to FIG. 4 with like elements indicated by like reference numbers. It indicates that the elliptical orbit 110 has a perigee 114 facing the Sun line 90 and an apogee 116 at the other end of the elliptical orbit's major axis 118.

The elliptical orbit 110 is typically referred to as a Sun-synchronous orbit because it can be configured to keep its eccentricity vector 112 aligned with the Sun line 90. As shown in FIG. 4, solar pressure upon a spacecraft 20 induces an eccentricity vector which is oriented orthogonally to the Sun line 90 and which leads the Sun line 90 by ninety degrees. This is indicated by eccentricity vector 120 in FIG. 5. In a selected time interval of one sidereal day, this eccentricity vector 120 will have a magnitude Δe as shown in FIGS. 5 and 6A. The magnitude Δe is a function of various spacecraft parameters (e.g., area and attitude of the exposed spacecraft surface and the reflection of coefficient of the spacecraft surface).

In FIG. 6A, the initial eccentricity vector 112 has a magnitude of $e_i$. At the end of one sidereal day, the Sun-synchronous orbit 110 will have a final eccentricity vector 122 (with a magnitude of $e_f$) which is the vector sum of the eccentricity vector $e_i$ and Δe. The angular movement of the Sun line 90 is one degree. Therefore, if the magnitude of the initial eccentricity vector 112 is selected so that the angular distance 124 between the initial vector 112 and the final vector 120 is also one degree, the eccentricity of the Sun-synchronous orbit 110 will substantially track the Sun line 90. That is, the eccentricity vector of the Sun-synchronous orbit 110 will continuously move as indicated by the angular arrow 126 so that it is substantially aligned with the Sun line 90.

FIGS. 7A and 7B are views which are similar to FIG. 5 with like elements indicated by like reference numbers. In FIG. 7A, the spacecraft 20 has been positioned in a Sun-synchronous orbit 110 over an area of the Earth in which it is exposed to an eastward triaxiality force as indicated by the force vector 130 (gravity and Earth's triaxial shape along its equatorial plane generate tangential force components, the magnitude and direction of these components is a function of spacecraft longitude). As discussed above with respect to FIG. 3A, an eastward tangential force increases the orbital size and causes an westward spacecraft drift acceleration as indicated by the drift acceleration vector 132 (and labeled $d_a$). The spacecraft 20 is shown at two exemplary positions in its orbit to show that the eastward triaxiality force and the resulting drift acceleration are constant throughout the orbit.

In contrast, the spacecraft 20 is positioned in FIG. 7B over an area of the Earth in which it is exposed to a westward triaxiality force as indicated by the force vector 134. As discussed above with respect to FIG. 3B, a westward tangential force decreases the orbital size and causes eastward spacecraft drift acceleration as indicated by the drift acceleration vector 136.

If not counteracted, the longitudinal drift accelerations of FIGS. 7A and 7B will remove the spacecraft 20 from its allocated station. In accordance with a method of the present invention, the thrusters of the thruster system 40 of FIGS. 2A–2C are used to counter the triaxiality forces of FIGS. 7A and 7B while simultaneously maintaining the Sun-synchronous orbit 110. In addition, the thrusters may be used to generate turning moments in the spacecraft to facilitate momentum dumping.

As indicated in FIG. 2A, the thrusters are initially divided into first and second diagonal pairs of thrusters 140 and 142. The first thruster pair 140 comprises the northwest thruster 42 and the southeast thruster 48 and the second thruster pair comprises the northeast thruster 44 and the southwest thruster 46.

In a method step, one of the thruster pairs is selected. If the spacecraft 20 is positioned over an area of the Earth in which it is subjected to an eastward triaxiality force (as in FIG. 7A), the selected pair of thrusters are fired to counter the triaxiality force in an orbital region that leads the Sun line 90 by ninety degrees.

In particular, the selected thruster pair is fired to generate a westward tangential force vector 154 that is shown in FIG. 8A (and labeled $f_{th}$ to indicate thruster force) in an orbital region 152 (indicated by hatched lines). This westward tangential force decreases the orbital size and causes an eastward spacecraft drift. The thrusters of the selected thruster pair are fired with thrusts that are selected to generate a tangential westward component that substantially offsets the eastward triaxiality force 130 of FIG. 7A and obtains a substantially zero drift. As discussed above with reference to FIG. 3A, such a tangential westward thrust is associated with an eccentricity vector 156 that is directed away from the thrust application point and which has a magnitude Δe' that is a function of the tangential thrust component.

When the spacecraft 20 is in an orbital region 158 (indicated by hatched lines) that lags the Sun line 90 by ninety degrees, the selected thruster pair is fired to facilitate momentum dumping of onboard momentum wheels (or reaction wheels). Accordingly, the thrusters are rotated and/or translated so that their thrust lines are spaced from the spacecraft's center of mass (50 in FIG. 2A). Thus, their thrust will generate turning moments upon the spacecraft which are used to dump momentum in the momentum wheels. This operation is exemplified in FIG. 2A by a rotation and translation of thruster 46 to an orientation 46A in which the thruster's thrust line 160 is offset from the spacecraft's center of mass 50.

In calculating the thrust line offset and the thrust magnitude, calculation restraints are included which require that the radial thrust component generated in the orbital region 158 substantially equals the radial thrust component generated in the orbital region 152. Thus, the radial thrust components at the orbital regions 152 and 158 are offsetting and will not change the orbital eccentricity. In addition, calculation restraints are included which require that the tangential thrust component generated at the orbital region 158 is substantially zero so that the tangential thrust component in this region will not substantially change the orbital size nor substantially affect the spacecraft's drift.

Because the eccentricity vector 156 opposes the eccentricity vector 120 of FIG. 5, it reduces the net eccentricity that is induced by solar pressure. For example, the eccentricity vector 120 of FIG. 6A is reduced to a reduced eccentricity vector 161 of FIG. 6B. To maintain Sun tracking, therefore, the initial and final eccentricity vectors 112 and 122 of FIG. 6A are also correspondingly reduced to vectors 162 and 163 of FIG. 6B that maintain the angular movement 124 which approximates the one degree movement of the Sun line (90 in FIG. 8A). Thus, the eccentricity vector 112A of FIG. 8A can be reduced in magnitude from the eccentricity vector 112 of FIG. 7A.

In summary, firing of a selected thruster pair (selected from the pairs 140 and 142 of FIG. 2A) in the orbital region 152 controls the spacecraft's drift (by offsetting the eastward triaxiality force), maintains the Sun-synchronous orbit 110 and reduces the eccentricity of the orbit (the degree of eccentricity reduction, however, is determined by the magnitude of the triaxiality force). Firing of the selected thruster pair in the orbital region 158 facilitates momentum dumping, substantially cancels the radial thrust components generated at the orbital region 152 and generates a substantially zero tangential thrust component.

The method steps recited above with reference to FIGS. 7A and 8A are revised in two ways if the spacecraft 20 is positioned over an area of the Earth in which it is subjected to a westward triaxiality force as shown in FIG. 7B.

First, the selected thruster pair is fired in the orbital region 158 that lags the Sun line 90 by ninety degrees. This firing generates the tangential eastward force vector 164 that is shown in FIG. 8B. This eastward tangential force increases the orbital size and causes a westward spacecraft drift. The thrusters of the selected thruster pair are fired with thrusts that are selected to generate a tangential force that substantially offsets the eastward triaxiality force 134 of FIG. 7B and obtains a substantially zero drift.

As discussed above, such an eastward tangential thrust is associated with an eccentricity vector 166 that is directed towards the thrust application point and which has a magnitude Δe" that is a function of the tangential thrust magnitude. Note that the eccentricity vector 166 has the same orientation as the eccentricity vector 156 of FIG. 8A so that it also opposes the eccentricity vector 120 of FIG. 5. Therefore, the eccentricity vector 112 of FIG. 7A is reduced in magnitude to the eccentricity vector 112B of FIG. 8B (the degree of eccentricity reduction, however, is determined by the magnitude of the triaxiality force).

In a second method revision, the selected thruster pair is fired to facilitate momentum dumping when the spacecraft 20 is in the orbital region 152 that leads the Sun line 90 by ninety degrees.

In the stationkeeping and momentum-dumping methods described above, the necessary tangential force to offset triaxiality forces is generated at an initial region of the spacecraft's orbit, e.g., in the region 152 in FIG. 8A. At the opposite orbital region, e.g, the region 158 in FIG. 8A, the momentum-dumping turning moments are generated by a firing which is restrained to generate a substantially zero tangential force and a radial force which cancels that generated at the initial region. The magnitude of the tangential force is determined by the triaxiality force of the orbital region where the spacecraft is stationed. Accordingly, the associated eccentricity vector (156 in FIG. 8A and 166 in FIG. 8B) is also determined by the triaxiality force and the reduction of the orbital eccentricity is thus limited.

In another stationkeeping and momentum-dumping method, opposed tangential forces are generated in both orbital regions 152 and 158 with the net tangential force being that needed to offset triaxiality forces. For example, in FIG. 8A the selected thruster pair is fired in the orbital region 158 to generate an eastward tangential force vector 172. Such an eastward tangential thrust is associated with an eccentricity vector 176 that is directed towards the thrust application point and which has a magnitude $\Delta e'''$ that is a function of the tangential thrust magnitude.

The magnitudes of the westward tangential force vector 154 and the eastward tangential force vector 172 are selected to obtain a net westward thrust which offsets the triaxiality force 130 of FIG. 7A. Although this tangential difference provides the required tangential force, the net generated eccentricity will be the sum of the eccentricity vectors 156 and 176.

Therefore, a larger eccentricity vector (the sum of eccentricity vectors 156 and 176) can be generated in this stationkeeping and momentum-dumping method to oppose the Sun-generated eccentricity vector 120 of FIG. 5. Accordingly, the net eccentricity vector (vector sum of vectors 156 and 176 and vector 120 of FIG. 6A) can be reduced. As a consequence, the size of the initial and final vectors 112 and 122 of FIG. 6A can be reduced and still generate an angular movement 124 that approximates the one degree movement of the Sun line (90 in FIG. 8A). Essentially, this means that the eccentricity vector 112A of FIG. 8A can be further reduced while still maintaining a Sun-synchronous orbit.

As is known, an eccentric orbit generates an east-west drift oscillation over each orbital cycle. From perigee to apogee the spacecraft will be east of its average position and from apogee to perigee, it will be west of its average position. Because this latter method of the invention facilitates a further eccentricity reduction of the Sun-synchronous orbit, it enhances the longitudinal control of the spacecraft while still offsetting the triaxiality forces. In this method, momentum-dumping moments can be generated at one or both of the orbital regions 152 and 158 with the restraint that radial thrust components at these regions are equal and offsetting.

In yet another stationkeeping and momentum-dumping method, tangential forces are generated on one side of the Sun line 90 (e.g., leading the Sun line between 0 and 180 degrees) and the momentum-dumping turning moments are generated on the opposite side of the Sun line 90 (e.g., laging the Sun line between 0 and 180 degrees) but not necessarily in the regions 152 and 158.

To illustrate this method, it is initially assumed that the satellite 20 is subjected to an eastward triaxiality force and that a tangential westward force 185 is applied at a first firing point 186 in FIG. 8A. The magnitude of this tangential force is selected to counter the eastward triaxiality force. A momentum-dumping force is subsequently generated at a second firing point 188 that is substantially one hundred eighty degrees from the first firing point 186. The momentum-dumping force and the tangential westward force 185 can be generated by the same or different ones of the thruster pairs 140 and 142 of FIG. 2A. In this method, however, the thrusts at the two firing points are configured to generate a net radial force rather than equal and offsetting radial forces.

Associated with the westward force 185 will be an eccentricity vector 190 which is shown in the enlarged view of FIG. 9. The eccentricity vector 190 will be directed away from the first firing point 186 and thus aligned with the broken line 192 between the first and second firing points 186 and 188. The net radial force (generated by radial thrust components at the first and second firing points 186 and 188) will be associated with an eccentricity vector 194 that is normal to the broken line 192 between the first and second firing points 186 and 188 (as discussed above with reference to FIGS. 3A and 3B, a radial force is associated with an eccentricity vector that is normal to the radial force). The eccentricity vectors 190 and 194 vectorially sum to form a total eccentricity vector 196 that is shown in FIG. 9 and labeled $\Delta e_r$.

The magnitude of the eccentricity vector 190 is determined by the magnitude of the tangential westward force 185 that is required to offset the eastward triaxiality force. However, the location of the first and second firing points 186 and 188 and the magnitude of the eccentricity vector 194 can all be selected to cause the total eccentricity vector 196 to be aligned with and opposed to the Sun-generated eccentricity vector 120 of FIG. 5 which is also shown in the enlarged view of FIG. 9 for reference.

Accordingly, the net eccentricity vector (vector sum of the total eccentricity vector 196 and the Sun-generated eccentricity vector 120) can be reduced. As a consequence, the size of the initial and final vectors 112 and 122 of FIG. 6A can also be reduced and still generate an angular movement 124 that approximates the one degree movement of the Sun line (90 in FIG. 8A). Basically, this means that the eccentricity vector 112A of FIG. 8A can be further reduced while still maintaining a Sun-synchronous orbit.

In this stationkeeping and momentum-dumping method, therefore, a thruster pair generates a tangential westward force in a region that leads the Sun line 90 between 0 and 180 degrees if the satellite is subjected to an eastward triaxiality force. In contrast, a thruster pair generates a tangential eastward force in a region that lags the Sun line 90 between 0 and 180 degrees if the satellite is subjected to a westward triaxiality force. The magnitude of the tangential force is selected to counter the triaxiality force and thereby control the spacecraft's drift. A momentum-dumping force is generated by a thruster pair at a second firing point 188 that is substantially one hundred eighty degrees from the first firing point 186.

The thruster firings at the first and second firing points are configured to also produce a net radial force. An eccentricity vector associated with the net radial force sums with an eccentricity vector associated with the tangential drift control thrust to provide a total eccentricity vector (196 in FIG. 9) that is larger than would have been available from the drift control thrust alone. Finally, the location of the first and second firing points is selected to place the total eccentricity vector in opposition to the Sun-generated eccentricity vector (as shown in FIG. 9). This facilitates a further eccentricity reduction of the Sun-synchronous orbit and, therefore, enhances the longitudinal control of the spacecraft while still offsetting the triaxiality forces.

Figure 1:
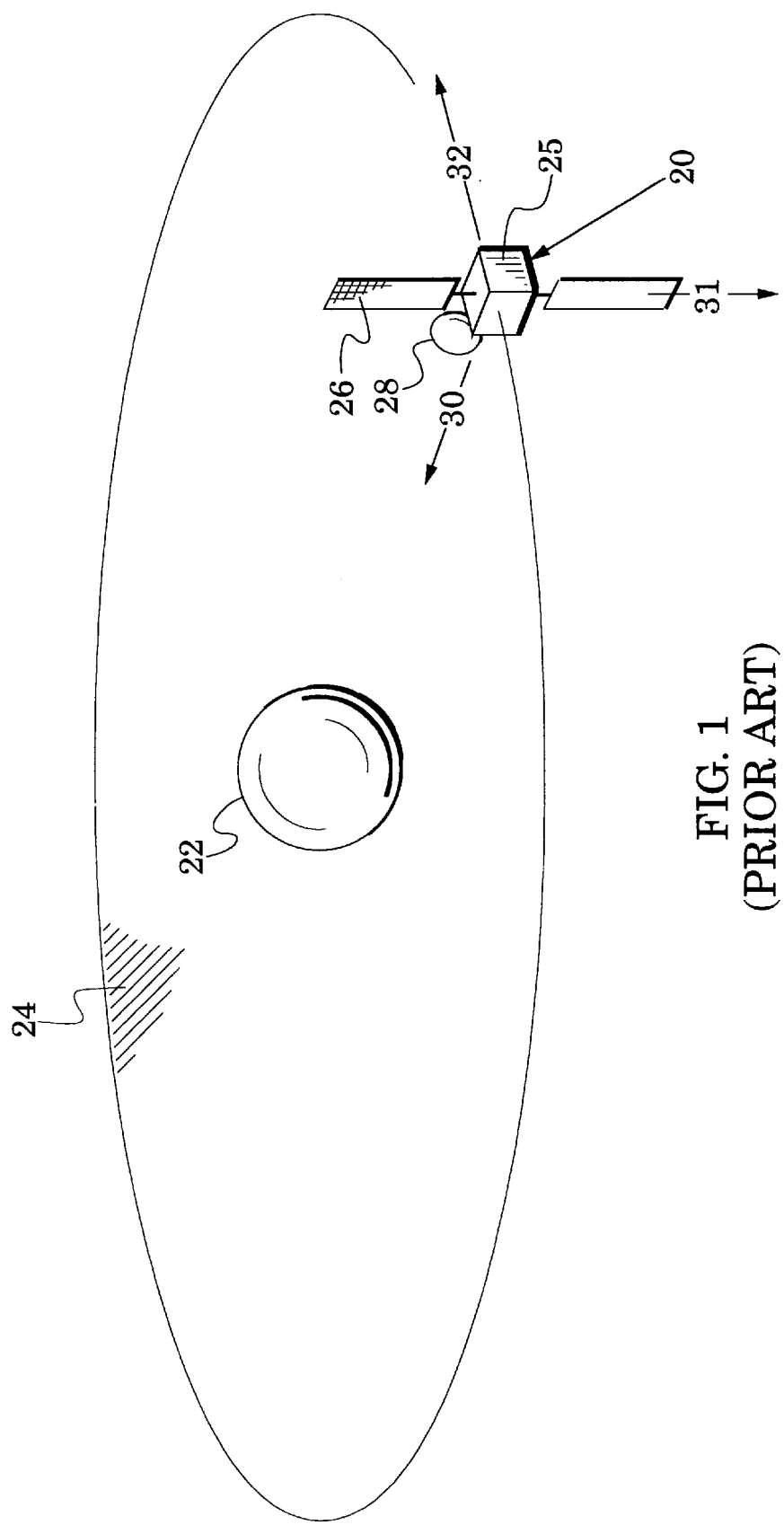
FIG. 1 is a perspective view of a spacecraft in an Earth orbit.

Firings of selected thruster pairs will typically generate small net normal thrust components, i.e., thrust components that are normal to the spacecraft's orbital plane (24 in FIG. 1). Accordingly, the teachings of the invention are especially suited for stationkeeping of spacecraft that are in inclined orbits because the effect of small normal components upon orbit inclination is generally acceptable in inclined orbits.

Some spacecraft move in permanently inclined orbits and others move at least temporarily in inclined orbits. For example, spacecraft are often placed in "storage orbits" prior to being placed into a permanent orbit. Such a storage orbit can generally be an inclined orbit whose orbital normal is oriented so that it drifts (under influence of the moon and the Sun) close to an orbital normal position of the permanent orbit.

The teachings of the invention may be practiced with either of the thruster pairs 140 and 142 of FIG. 2A as a selected thruster pair. The selection of a selected pair can be changed as often as desired, e.g., different thruster pairs could be used on alternate orbits or even on different portions of the same orbit.

However, thrust levels, directions and times must be calculated for each selected thruster pair. To reduce calculation efforts, it may be preferable to use one selected thruster pair for an extended time, e.g., a year, before switching to use of the other thruster pair. On the other hand, use of only one selected pair on a permanent basis is preferably avoided because that may cause one thruster pair to exceed its predicted lifetime. Because the methods of the invention can be carried out with only one thruster pair, the methods have a built-in redundancy which provides continued method operation in the event of thruster failure.

The teachings of the invention can be practiced with any thrusters. If thrusters with large thrust are used (e.g., chemical thrusters) the orbital firings will be spaced greater in time (e.g. ~fourteen days). If thrusters with small thrust are used (e.g., ion thrusters) the orbital firings can be performed more often (e.g., performed each orbit). Use of ion thrusters therefore enhances the resolution of the stationkeeping control. In addition, the high specific impulse of ion thrusters enhances the fuel efficiency of the stationkeeping and momentum dumping.

Although the stationkeeping and momentum-dumping methods of the invention have been described with the thruster pairs 140 and 142 of FIG. 1 positioned adjacent to an antinadir face 41, the teachings of the invention can also be practiced with thruster pairs that are positioned adjacent to a nadir face. To facilitate these methods, FIGS. 2A–2C represent a spacecraft with a nadir face 41 (rather than an antinadir face 41) and diagonal thruster pairs 140 and 142 are carried adjacent to the nadir face. The thrusters 42, 44, 46 and 48 are directable (by rotation and/or translation) so that their thrust lines (e.g., the thrust line 160) can selectively be caused to pass through the spacecraft's center of mass 50 (for stationkeeping) or be spaced from the center of mass (for momentum dumping). The rotation and/or translation of the thrusters of the thruster system 40 of FIGS. 2A–2C can be accomplished with conventional spacecraft thruster mounting structures, e.g., gimbals and servo mechanisms.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method of stationkeeping a spacecraft, comprising the steps of:

providing said spacecraft with first and second pairs of thrusters adjacent a selected one of a nadir or an antinadir face of said spacecraft wherein said first thruster pair comprises a northwest and a southeast thruster and said second thruster pair comprises a northeast and a southwest thruster;

placing said spacecraft in a Sun-synchronous elliptical orbit which has an initial eccentricity vector aligned with a Sun line between said spacecraft and a Sun, solar pressure from said Sun thereby generating a solar-pressure eccentricity vector which leads said Sun line by substantially ninety degrees;

when said spacecraft is positioned at a longitude where it is exposed to an eastward triaxiality force, applying a westward force to said spacecraft in an orbital region which leads said Sun line by substantially ninety degrees to counter a drift acceleration caused by said eastward triaxiality force and to generate a westward-force eccentricity vector which lags said Sun line by substantially ninety degrees and opposes said solar-pressure eccentricity vector, said westward force applied with a selected one of said first and second pairs of thruster pairs; and when said spacecraft is positioned at a longitude where it is exposed to a westward triaxiality force, applying an eastward force to said spacecraft in an orbital region which lags said Sun line by substantially ninety degrees to counter a drift acceleration caused by said westward triaxiality force and to generate an eastward-force eccentricity vector which lags said Sun line by substantially ninety degrees and opposes said solar-pressure eccentricity vector, said eastward force applied with said selected thruster pair.

2. The method of claim 1, wherein said westward-force applying step includes the step of selecting a magnitude for said westward force that substantially eliminates said drift acceleration that is caused by said eastward triaxiality force.

3. The method of claim 1, wherein said eastward-force applying step includes the step of selecting a magnitude for said eastward force that substantially eliminates said drift acceleration that is caused by said westward triaxiality force.

4. The method of claim 1, further including the steps of:

when said spacecraft is positioned at a longitude where it is exposed to an eastward triaxiality force, generating with said selected thruster pair a first momentum-dumping force in an orbital region which lags said Sun line by substantially ninety degrees, said first momentum-dumping force offset from a center of gravity of said spacecraft; and when said spacecraft is positioned at a longitude where it is exposed to a westward triaxiality force, generating with said selected thruster pair a second momentum-dumping force in an orbital region which leads said Sun line by substantially ninety degrees, said second momentum-dumping force offset from a center of gravity of said spacecraft.

5. The method of claim 4, further including the step of selecting a thrust and direction of said selected thruster pair so that said first and second momentum-dumping forces each have a substantially zero tangential component.

6. The method of claim 4, further including the step of selecting a thrust and direction of said selected thruster pair so that said westward force and said first momentum-dumping force have substantially equal and opposite radial components and so that said eastward force and said second momentum-dumping force have substantially equal and opposite radial components.

7. The method of claim 1, further including the steps of:

when said spacecraft is positioned at a longitude where it is exposed to an eastward triaxiality force, generating with the other of said thruster pairs a first momentum-dumping force in an orbital region which lags said Sun line by substantially ninety degrees, said first momentum-dumping force offset from a center of gravity of said spacecraft; and when said spacecraft is positioned at a longitude where it is exposed to a westward triaxiality force, generating with said other thruster pair a second momentum-dumping force in an orbital region which leads said Sun line by substantially ninety degrees, said second momentum-dumping force offset from a center of gravity of said spacecraft.

8. The method of claim 7, further including the step of selecting a thrust and direction of said other thruster pair so that said first and second momentum-dumping forces each have a substantially zero tangential component.

9. The method of claim 7, further including the step of selecting a thrust and direction of said other thruster pair so that said westward force and said first momentum-dumping force have substantially equal and opposite radial components and so that said eastward force and said second momentum-dumping force have substantially equal and opposite radial components.

10. A method of stationkeeping a spacecraft, comprising the steps of:

providing said spacecraft with first and second pairs of thrusters adjacent a selected one of a nadir or an antinadir face of said spacecraft wherein said first thruster pair comprises a northwest and a southeast thruster and said second thruster pair comprises a northeast and a southwest thruster;

placing said spacecraft in a Sun-synchronous elliptical orbit which has an initial eccentricity vector aligned with a Sun line between said spacecraft and a Sun, solar pressure from said Sun thereby generating a solar-pressure eccentricity vector which leads said Sun line by substantially ninety degrees;

when said spacecraft is positioned at a longitude where it is exposed to an eastward triaxiality force, a) applying a westward force to said spacecraft in a first orbital region which leads said Sun line by substantially ninety degrees, said westward force associated with a westward-force eccentricity vector which lags said Sun line by substantially ninety degrees and opposes said solar-pressure eccentricity vector;

b) applying an eastward force to said spacecraft in a second orbital region which lags said Sun line by substantially ninety degrees, said eastward force associated with an eastward-force eccentricity vector which lags said Sun line by substantially ninety degrees and opposes said solar-pressure eccentricity vector; and c) selecting magnitudes of said westward force and said eastward force to provide a net westward force that substantially counters a drift acceleration caused by said eastward triaxiality force;

when said spacecraft is positioned at a longitude where it is exposed to a westward triaxiality force, a) applying a westward force to said spacecraft in said first orbital region which leads said Sun line by substantially ninety degrees, said westward force associated with a westward-force eccentricity vector which lags said Sun line by substantially ninety degrees and opposes said solar-pressure eccentricity vector;

b) applying an eastward force to said spacecraft in said second orbital region which lags said Sun line by substantially ninety degrees, said eastward force associated with an eastward-force eccentricity vector which lags said Sun line by substantially ninety degrees and opposes said solar-pressure eccentricity vector; and c) selecting magnitudes of said westward force and said eastward force to provide a net eastward force that substantially counters a drift acceleration caused by said westward triaxiality force.

11. The method of claim 10, further including the step of selecting a magnitude for said net westward force that substantially eliminates said drift acceleration that is caused by said eastward triaxiality force.

12. The method of claim 10, further including the step of selecting a magnitude for said net eastward force that substantially eliminates said drift acceleration that is caused by said eastward triaxiality force.

13. The method of claim 10, further including the step of generating, with said selected thruster pair, momentum-dumping forces in said first and second orbital regions which are offset from a center of gravity of said spacecraft.

14. The method of claim 13, further including the step of selecting thrusts and directions of said selected thruster pair so that said momentum-dumping forces have substantially zero tangential components.

15. The method of claim 13, further including the step of selecting thrusts and directions of said selected thruster pair so that said net westward force and said momentum-dumping forces have substantially equal and opposite radial components and so that said net eastward force and said momentum-dumping forces have substantially equal and opposite radial components.

16. The method of claim 10, further including the step of generating, with the other of said thruster pairs, momentum-dumping forces in said first and second orbital regions which are offset from a center of gravity of said spacecraft.

17. The method of claim 16, further including the step of selecting thrusts and directions of said other thruster pair so that said momentum-dumping forces have substantially zero tangential components.

18. The method of claim 16, further including the step of selecting thrusts and directions of said other thruster pair so that said net westward force and said momentum-dumping forces have substantially equal and opposite radial components and so that said net eastward force and said momentum-dumping forces have substantially equal and opposite radial components.

19. A method of stationkeeping a spacecraft, comprising the steps of:

providing said spacecraft with first and second pairs of thrusters adjacent a selected one of a nadir or an antinadir face of said spacecraft wherein said first thruster pair comprises a northwest and a southeast thruster and said second thruster pair comprises a northeast and a southwest thruster;

placing said spacecraft in a Sun-synchronous elliptical orbit which has an initial eccentricity vector aligned with a Sun line between said spacecraft and a Sun, solar pressure from said Sun thereby generating a solar-pressure eccentricity vector which leads said Sun line by substantially ninety degrees;

when said spacecraft is positioned at a longitude where it is exposed to an eastward triaxiality force, a) applying with one of said first and second pairs of thruster pairs a westward force to said spacecraft at a first firing point in an orbital region which leads said Sun line between 0 and 180 degrees to counter a drift acceleration caused by said eastward triaxiality force and to generate a westward-force eccentricity vector which is directed away from said first firing point;

b) generating with one of said first and second pairs of thruster pairs a first momentum-dumping force at a second firing point which is substantially one hundred and eighty degrees from said first firing point, said first momentum-dumping force offset from a center of gravity of said spacecraft; and c) applying with one of said first and second pairs of thruster pairs at said first and second points a radial force which generates a radial-force eccentricity vector that is normal to said westward-force eccentricity vector, said radial-force eccentricity vector and said westward-force eccentricity vector summing to form a total eccentricity vector; and d) selecting said first and second firing points to cause said total eccentricity vector to oppose said solar-pressure eccentricity vector;

when said spacecraft is positioned at a longitude where it is exposed to a westward triaxiality force, a) applying with one of said first and second pairs of thruster pairs an eastward force to said spacecraft at a first firing point in an orbital region which lags said Sun line between 0 and 180 degrees to counter a drift acceleration caused by said westward triaxiality force and to generate an eastward-force eccentricity vector which is directed towards said first firing point;

b) generating with one of said first and second pairs of thruster pairs a second momentum-dumping force at a second firing point which is substantially one hundred and eighty degrees from said first firing point, said second momentum-dumping force offset from a center of gravity of said spacecraft; and c) applying with one of said first and second pairs of thruster pairs at said first and second points a radial force which generates a radial-force eccentricity vector that is normal to said eastward-force eccentricity vector, said radial-force eccentricity vector and said eastward-force eccentricity vector summing to form a total eccentricity vector; and d) selecting said first and second firing points to cause said total eccentricity vector to oppose said solar-pressure eccentricity vector.

20. The method of claim 19, wherein:

said westward force and said first momentum-dumping force are applied with the same one of said first and second pairs of thruster pairs; and said eastward force and said second momentum-dumping force are applied with the same one of said first and second pairs of thruster pairs.

21. The method of claim 19, wherein:

said westward-force applying step includes the step of selecting a magnitude for said westward force that substantially eliminates said drift acceleration that is caused by said eastward triaxiality force; and said eastward-force applying step includes the step of selecting a magnitude for said eastward force that substantially eliminates said drift acceleration that is caused by said westward triaxiality force.

22. The method of claim 19, further including the step of restraining said first and second momentum-dumping forces to each have a substantially zero tangential component.

* * * * *